United States Patent [19]
Hiramitsu et al.

[11] Patent Number: 5,382,049
[45] Date of Patent: Jan. 17, 1995

[54] AIR BAG CONTROLLING APPARATUS

[75] Inventors: Tetsushi Hiramitsu; Toshinori Takahashi; Yuji Takahashi, all of Inazawa, Japan

[73] Assignee: Toyoda Gosei Co., Ltd., Nishikasugai, Japan

[21] Appl. No.: 14,999

[22] Filed: Feb. 8, 1993

[30] Foreign Application Priority Data

Feb. 10, 1992 [JP] Japan ................... 4-057506

[51] Int. Cl.⁶ .................................. B60R 21/32
[52] U.S. Cl. ........................ 280/735; 280/731; 340/436
[58] Field of Search ........... 280/735, 734, 731, 728 R; 364/424.01, 424.05; 307/10.1; 324/527, 727; 340/669, 436, 438, 440

[56] References Cited
U.S. PATENT DOCUMENTS

| | | | |
|---|---|---|---|
| 4,497,025 | 1/1985 | Hannoyer | 364/424 |
| 5,014,810 | 5/1991 | Mattes et al. | 180/268 |
| 5,068,793 | 11/1991 | Condne et al. | 280/735 |

FOREIGN PATENT DOCUMENTS

| | | | |
|---|---|---|---|
| 440133 | 8/1991 | European Pat. Off. | 280/735 |
| 3816591 | 11/1989 | Germany | 280/735 |
| 57-182546 | 11/1982 | Japan . | |
| 04503339 | 6/1992 | Japan . | |

Primary Examiner—Eric D. Culbreth
Attorney, Agent, or Firm—Cushman, Darby & Cushman

[57] ABSTRACT

An air bag controlling apparatus for controlling inflation of an air bag for a motor vehicle and adapted to cooperate with (i) an inflator which provides said air bag with compressed gas when ignited by an igniter, and (ii) an acceleration sensor which generates an appropriate deceleration signal as a function of the vehicle's deceleration. The apparatus comprises a threshold value storage for storing a threshold value used in determining whether the inflator will be ignited and a calculator for calculating a displacement amount of the vehicle. A waveform evaluator evaluates the waveform of the deceleration signal to determine whether an initial period for which the deceleration has a positive value continues for a predetermined interval of time after a predetermined deceleration is detected. A threshold value corrector corrects the threshold value stored in the threshold value storage when the waveform evaluator determines that the initial period for which the deceleration has a positive value has continued for the predetermined interval of time. A discriminator determines whether the displacement amount calculated by the calculating means is greater than the corrected threshold value. Finally, a signal output generator outputs the ignition signal to the inflator so that the inflator is ignited and the air bag is inflated when the discriminator determines that the displacement amount calculated by the calculator is greater than the corrected threshold value.

20 Claims, 6 Drawing Sheets

AIR BAG CONTROLLING APPARATUS

BACKGROUND OF THE INVENTION

1. Field of the Invention

This invention relates to an air bag controlling apparatus disposed at a lower portion of a pad section of the steering wheel of a vehicle.

2. Description of the Related Art

An air bag controlling apparatus for controlling the operation of an air bag for an automobile is conventionally known wherein a deceleration of the vehicle is detected by using an acceleration sensor disposed at a suitable location of the vehicle. The acceleration sensor is integrated with respect to time to obtain a velocity component and then the velocity component is processed to render the air bag operative.

Various type of sensors are employed as the acceleration sensor, including a mechanical sensor which detects deceleration by making use of the inertia of a predetermined mass and an electric sensor which converts a strain caused by the deceleration into an electric signal using a strain gage or the like. A controller of the air bag controlling apparatus determines, based on an output signal of the acceleration sensor, whether or not the air bag should be rendered operative. In order to facilitate determination of operation of the air bag, large number of acceleration sensors must be disposed at locations where they can detect deceleration readily, such as, for example, at end portions of the vehicle.

When a large number of acceleration sensors are used as described above, the air bag controlling apparatus has a high cost cannot be mounted readily because long wiring lines are required. Therefore. investigations have been directed to reduce the number of acceleration sensors and rearrange the acceleration sensors to locations at which wiring lines to the acceleration sensors are laid readily. However, this causes the following problem.

In particular, when a deceleration signal from an acceleration sensor rises higher than a predetermined value or threshold level, if the velocity of the vehicle is low, then the air bag need not be rendered operative. Otherwise if the velocity of the vehicle is high, the air bag must be rendered operative. For example, a velocity waveform A and another velocity waveform B shown in FIG. 6, which shows time characteristics of calculated velocity values ΔV each obtained by integration of a deceleration signal from an acceleration sensor, are compared with each other. The velocity waveform A indicates that the calculated velocity value ΔV remains lower than a predetermined value even as time passes and accordingly, the air bag need not be rendered operative. However, at an initial stage, the velocity waveforms A and B are similar to each other. Accordingly, there is a problem in that, is difficult to judge it at an initial stage before the potential force of an imminent impact becomes excessively high, whether or not the air bag should be rendered operative. In other words it is difficult to quickly determine that the air bag should not be rendered operative with the velocity waveform A and that the air bag should be rendered operative with the velocity waveform B.

Therefore, the inventors have made a tedious investigation to solve the problem described above. As a result of the investigation, the inventors have found that the width of the waveform of the deceleration signal output from an acceleration sensor at an initial stage depends upon the velocity of the vehicle.

In particular, it has been found that, as shown in FIG. 7, the width of the waveform of the deceleration (−G) signal from an acceleration sensor at an initial stage is longer during low velocity running of the vehicle (acceleration waveform A) than during high velocity running (acceleration waveform B). The durations of the waveform widths during low velocity running and high velocity running are denoted by $t_L$ and $t_H$, respectively. In short, it has been found that the velocity of the vehicle should be discriminated based on the duration of the waveform width.

Further, while a high degree of accuracy is required for deceleration signals from acceleration sensors as described, a sensor portion of an acceleration sensor is estimated to involve in the output thereof the dispersion of 30% or so to the highest arising from its hysteresis characteristic in the manufacturing process. Accordingly, sensitivity correction is performed for the output of each of acceleration sensors to assure the accuracy of it, which results in increase of the cost.

SUMMARY OF THE INVENTION

It is an object of the present invention to provide an air bag controlling apparatus which renders an air bag operative based on the magnitude of a physical displacement amount of a vehicle which is judged based on a deceleration signal from an acceleration sensor.

It is another object of the present invention to provide an air bag controlling apparatus wherein sensitivity correction for an acceleration sensor which is necessitated from a hysteresis characteristic of the acceleration sensor is performed with any other element than the acceleration sensor to achieve an overall reduction of cost.

In order to attain the objects, according to a first aspect of the present invention, there is provided an air bag controlling apparatus wherein a deceleration of a vehicle is detected by an acceleration sensor and then a physical displacement amount of the vehicle is calculated based on a signal of the deceleration and compared with a preset predetermined threshold value. When the displacement amount reaches the predetermined threshold value, an inflator for discharging compressed gas therefrom is rendered operative to inflate air bag. The controlling apparatus operates by evaluating a waveform of the deceleration signal from the acceleration sensor with respect to time and determines whether or not an initial period for which the deceleration presents a positive value has continued for a predetermined interval of time or more after a predetermined deceleration was detected. When it is judged that the initial period has continued for the predetermined interval of time or more, correction either of expanding the threshold value to a value thereof multiplied by a predetermined fixed value or of reducing the displacement amount calculated thereafter based on the deceleration to a value thereof multiplied by a predetermined fixed value is effected.

In the air bag controlling apparatus, a deceleration signal from the acceleration sensor is used to calculate a physical displacement amount of the vehicle. After the predetermined deceleration is detected with regard to a waveform of the deceleration signal from the acceleration sensor with respect to time, it is judged whether or not an initial period for which the deceleration presents a positive value has continued for the predetermined interval of time after the predetermined deceleration was detected. Then, when it is determined that the initial period has continued for the predetermined interval of time, correction takes place either by expanding the threshold value to a value thereof multiplied by a predetermined fixed value or by reducing the displacement amount calculated thereafter based on the deceleration to a value thereof multiplied by a predetermined fixed value. Thereafter, the displacement amount and the threshold value are compared with each other in order to detect a point of time when the displacement amount exceeds the threshold value. Then, an ignition signal is output from the signal outputting means to the inflator in accordance with a result of discrimination of the discriminating means.

With the air bag controlling apparatus of the present invention, the magnitude of the physical displacement of the vehicle can be judged from the duration of an initial period for which the deceleration presents a positive value after the predetermined deceleration is detected with regard to the waveform of the deceleration signal from the acceleration sensor with respect to time. Consequently, the magnitude of the displacement can be judged at an earlier point of time than in the prior art to render the air bag operative. Further, since the judgment of the magnitude of the physical displacement amount of the vehicle is facilitated, it is not necessary to provide a plurality of acceleration sensors at locations where a deceleration can be detected readily such as end portions of the vehicle, but it is only necessary to provide a single acceleration sensor, for example, in a pad portion of a steering wheel in order to achieve the objects described above.

According to a second aspect of the present invention, the air bag controlling apparatus is characterized, in addition to the first aspect described above, in that it further comprises storage means in which a correction coefficient for correction of the deceleration obtained from the acceleration sensor is stored, and a correction value of the sensitivity corresponding to the deceleration signal from the acceleration sensor is written in advance in the storage means.

In the air bag controlling apparatus just described, the correction value of the sensitivity corresponding to the deceleration signal from the acceleration sensor is written in advance in the externally writable storage means.

Accordingly, the air bag controlling apparatus exhibits, in addition to the advantages according to the first aspect of the present invention described above, an additional advantage that, since it has an externally writable storage means and since correction of the sensitivity can be performed on the storage means side other than the acceleration sensor, the inspection step is simplified and allows easy correction. Consequently, an overall reduction of the cost can be achieved.

The above and other objects, features and advantages of the present invention will become apparent from the following description and the appended claims, taken in conjunction with the accompanying drawings in which like parts or elements are denoted by like reference characters.

DESCRIPTION OF THE INVENTION

Figure 8:
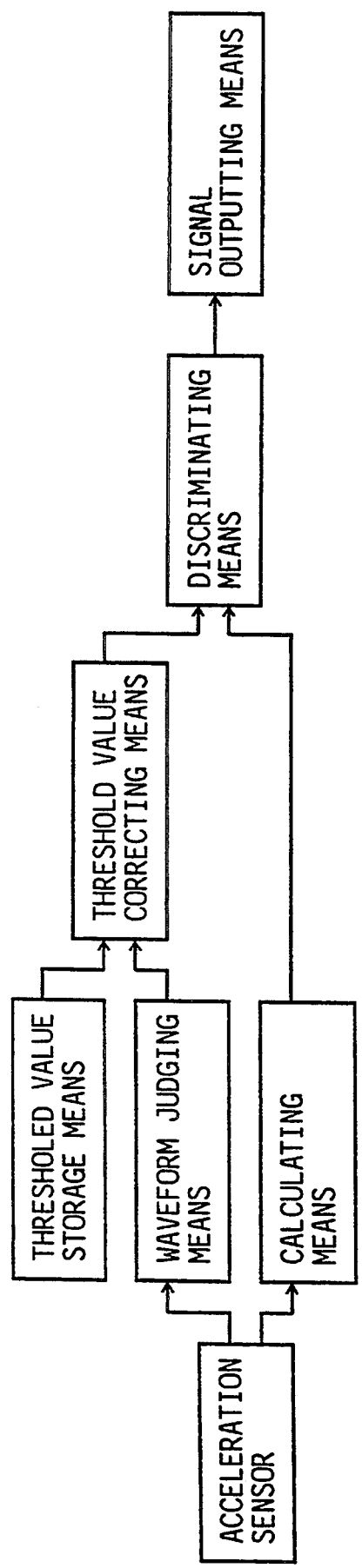
FIG. 8 is a block diagram showing a general construction of the air bag controlling apparatus.

Referring to FIG. 8, there is shown a general construction of an air bag controlling apparatus according to a preferred embodiment of the present invention. The air bag controlling apparatus is incorporated in a steering wheel of a vehicle as shown in FIG. 1.

Figure 1:
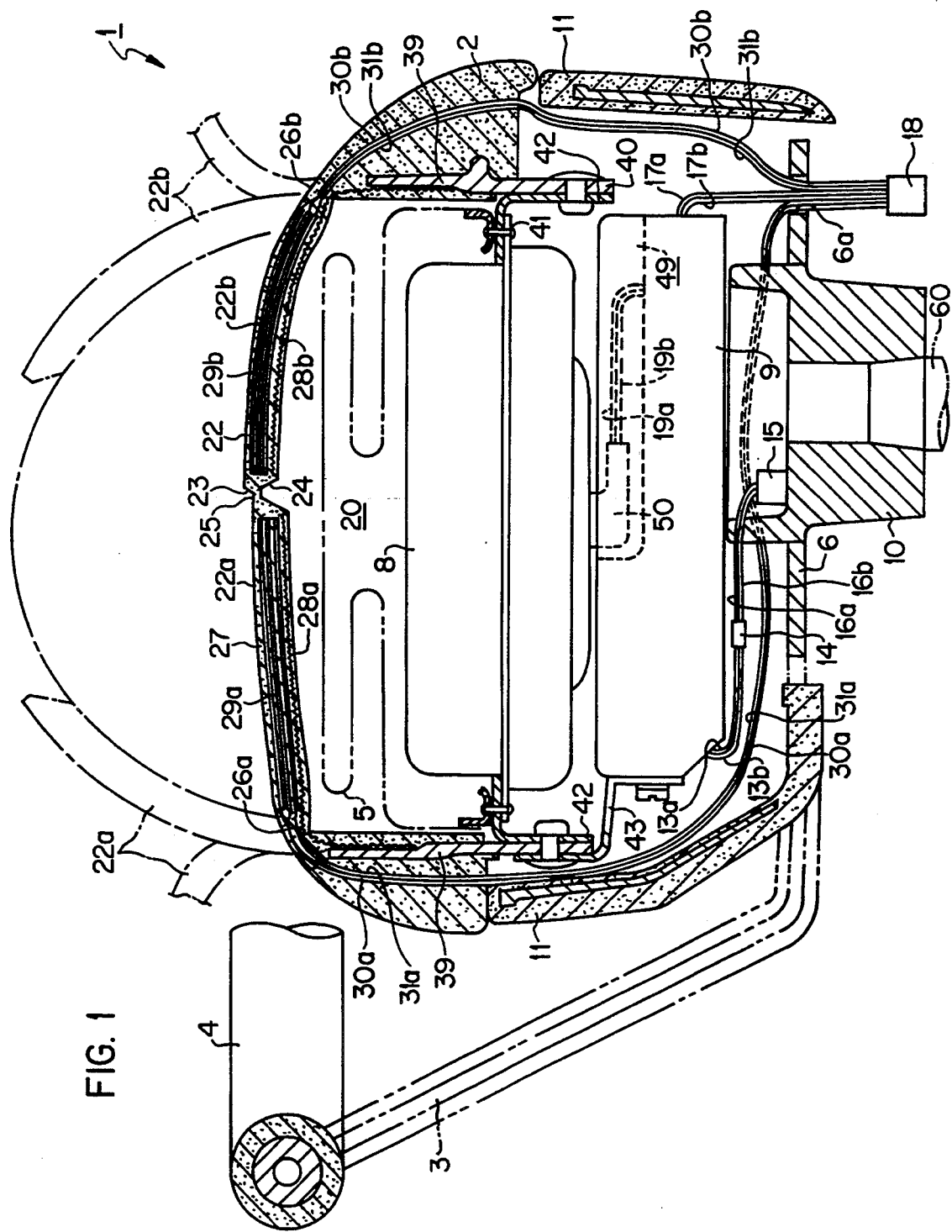
FIG. 1 is a vertical sectional view of a steering wheel provided with an air bag controlling apparatus according to a preferred embodiment of the present invention.

Referring to FIG. 1, the steering wheel 1 shown has a pad portion 2 having such a solid profile. An air bag 5 is accommodated in a folded condition in an inner space 20 of the pad portion 2. The pad portion 2 is formed from urethane foam rubber in which a mounting member 39 made of a resin material, and having a substantially cylindrical profile, is inserted. An inflator 8 is fitted on an L-shaped annular flange 41 and disposed at a central portion of the substantially cylindrical shape of the mounting member 39. A side wall 42 of the flange 41 extends downwardly and is riveted to a side wall 40 of the mounting member 39 which extends downwardly.

A controller 9 is fastened below the inflator 8 by means of bolts by way of a bracket 43 riveted to the side wall 42 of the flange 41.

A spoke 3 is joined to a metal plate 6 extending from a hub 10. The bracket 43 is fastened by means of bolts to an attachment (not shown) fastened to the metal plate 6 by means of other bolts not shown to securely mount the pad portion 2 on the metal plate 6. A cover 11 is disposed such that it covers over a lower portion of the pad portion 2.

A pair of grooves 23 and 24 are formed on the outer side and the inner side of a central portion of an upper wall of 22 of the pad portion 2 to define a reduced thickness portion 25 therebetween. The reduced thickness portion 25 will be broken by a pressure when the air bag 5 is rendered operative. The upper wall 22 is thus separated at the reduced thickness portion 25 thereof into a pair of upper wall portions 22a and 22b, which are thus hinged to open to the opposite sides around the fixed ends 26a and 26b at the opposite sides thereof at which no reduced thickness portion is formed.

A pair of meshes 28a and 28b and a pair of membrane switches 29a and 29b are disposed by insert molding on the opposite sides of the central reduced thickness portion 25 in an inner layer 27 of the upper wall 22 of the pad portion 2 such that each of them is secured at an end thereof to the mounting member 39.

A pair of lead wires 17a and 17b extend from the controller 9, and another pair of lead wires 30a and 31a or 30b and 31b extend from each of the membrane switches 29a and 29b. Three of the total of six lead wires including the lead wire 17a for tile controller 9 and the lead wires 30a and 30b for the membrane switches 29a and 29b are signal lines, while the other three lead wires including the lead wire 17b for the controller 9 and the lead wires 31a and 31b for the membrane switches 29a and 29b are grounding lines. The lead wires are all connected to a connector 18 through a hole 6a perforated in the metal plate 6.

The lead wires connected to the connector 18 are individually connected, for example, to known slip rings (not shown) by way of lead wires of a companion connector (not shown). The controller 9 and the membrane switches 29a and 29b are electrically connected to an electric circuit on the vehicle body side making use of sliding contact between the slip rings and corresponding sliders. It is to be noted that a spiral relay system which makes use of tape wires may be used as the relay system.

An acceleration sensor 15 is securely mounted on the hub 10 by means of a bolt not shown. A pair of lead wires 16a and 16b serving as a signal line and a grounding line, respectively, extend from the acceleration sensor 15 and are connected to a pair of lead wires 13a and 13b from the controller 9, respectively.

Another pair of lead wires 19a and 19b serving as a signal line and a grounding line, respectively, extend from the controller 9 and are connected to the bottom face side of the inflator 8 by way of a connector 50 made of a resin material. The lead wires 19a and 19b are accommodated in a recess 49 in the form of a groove formed on the controller 9.

Figure 2:
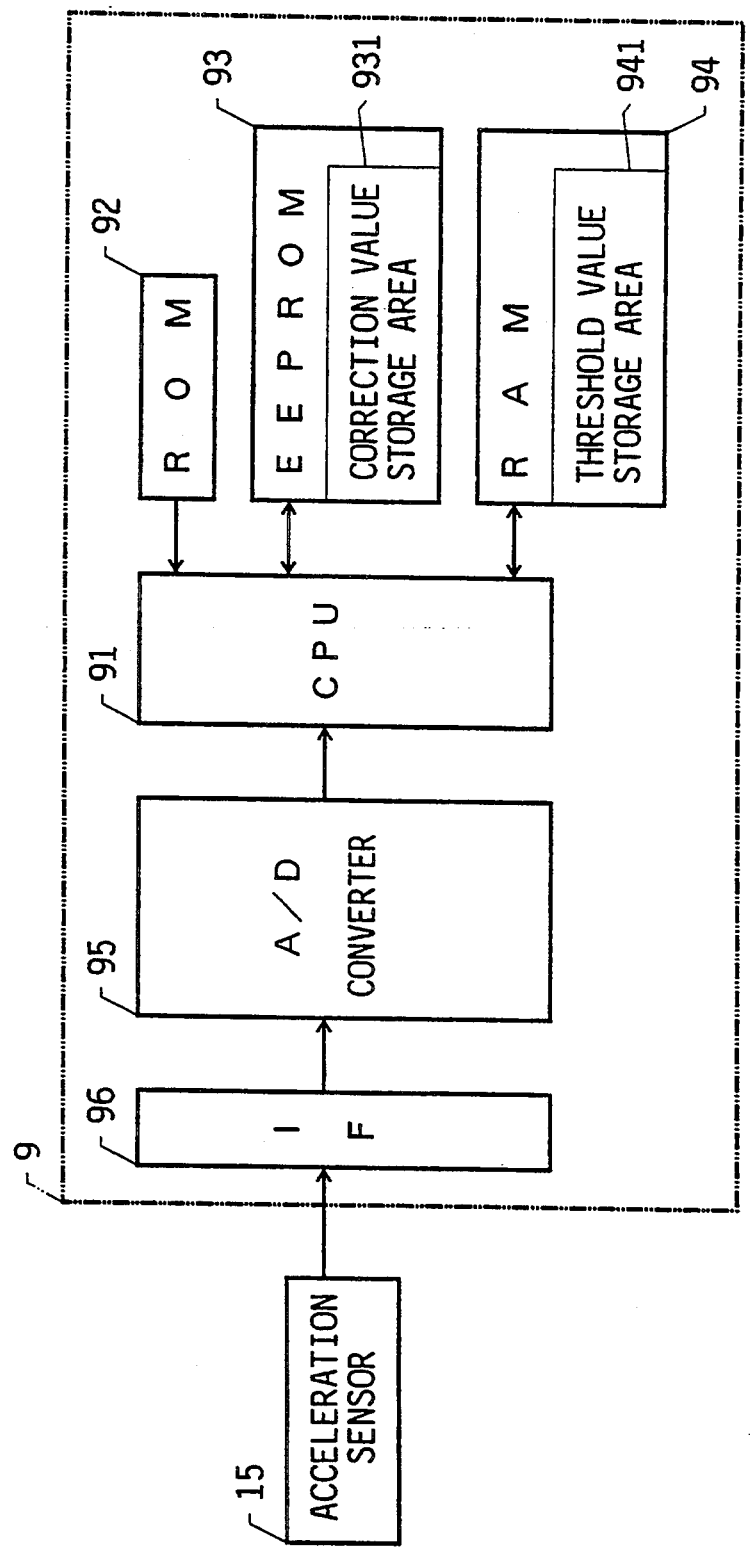
FIG. 2 is a block diagram showing the electronic construction of a controller of the air bag controlling apparatus.

Referring now to FIG. 2, the controller 9 includes, as principal components thereof, a CPU (central processing unit) 91, a ROM (read-only memory) 92 having a control program stored therein, an EEPROM (electrically erasable programmable read only memory) 93 constituting an externally writable storage apparatus, a RAM (random access memory) 94 which is provided for storing various data and so forth therein and serves as threshold value storage means, an analog to digital (A/D) converter 95, and an interface (IF) 96. The EEPROM 93 has a correction value storage area 931 in which correction values for a correction efficient for a sensitivity with which a reference acceleration (deceleration) is to be corrected in accordance with a deceleration ($-G$) signal output from the acceleration sensor 15. Meanwhile, the RAM 94 has a threshold value storage area 941 for storing therein a threshold value for determination of an ignition of the inflator 8 in response to a physical displacement amount of the vehicle based on a deceleration signal from the acceleration sensor 15.

A deceleration signal from the acceleration sensor 15 is input to the CPU 91 by way of the interface 96 and the analog to digital converter 95.

It is to be noted that, while the acceleration sensor 15 in the embodiment described above is provided on the hub 10 outside the controller 9, it need not be provided on the hub 10 but may be provided in the controller 9.

A processing procedure of the CPU 91 in the controller 9 employed in the air bag controlling apparatus of the present embodiment will be described below with reference to the flow chart of FIG. 3.

Figure 3:
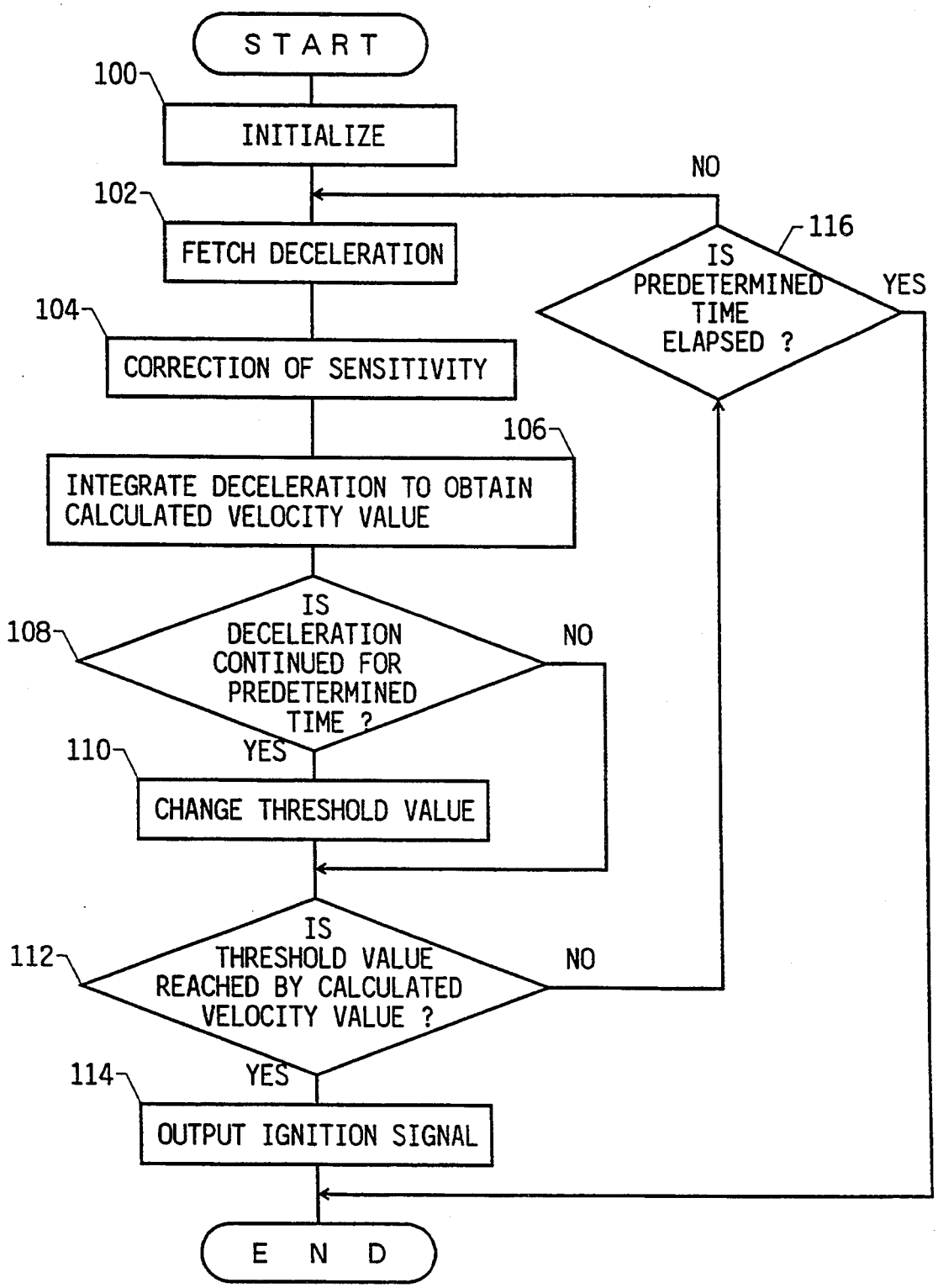
FIG. 3 is a flow chart illustrating a processing procedure of a CPU in the controller of the air bag controlling apparatus.
Figure 4:
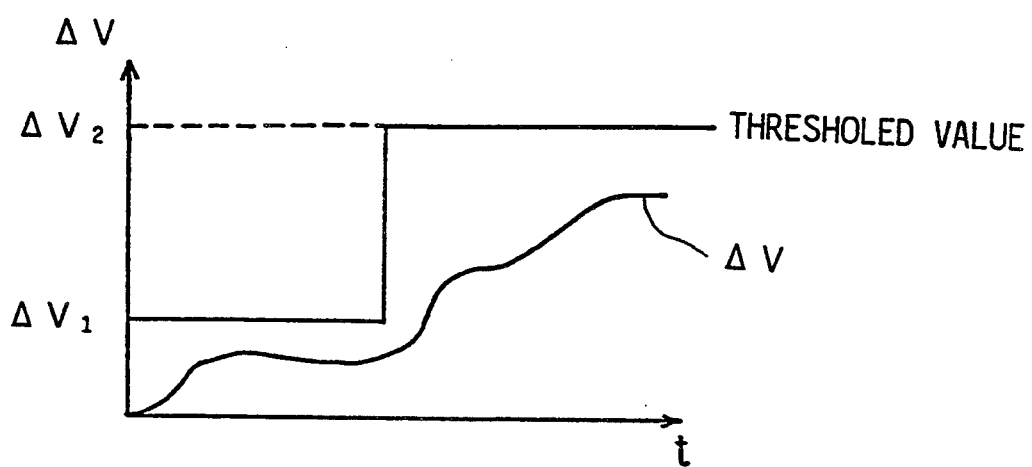
FIG. 4 is a diagram illustrating the relationship of threshold values $\Delta V_1$ and $\Delta V_2$ to a calculated velocity value $\Delta V$ with the air bag controlling apparatus when the velocity of the vehicle is low.

The program illustrated in FIG. 3 is provided to determine whether or not the air bag should be rendered operative. The program is started when a deceleration higher than $-3G$ is detected, and it is stopped after a predetermined allowable air bag operation time elapses.

First at step 100, initial values including a threshold value are set as initializing processing.

Then at step 102, a deceleration ($-G$) signal from the acceleration sensor 15 is fetched.

Then at step 104, the sensitivity of the acceleration sensor 15 is corrected with a correction value stored in advance in the EEPROM 93 in accordance with the acceleration sensor 15. At this point of time, the accuracy of the deceleration signal based on a hysteresis characteristic and so forth of the acceleration sensor 15 is restricted within a predetermined range.

Since output correction, which is conventionally performed on the acceleration sensor 15 side, can be performed on the air bag controlling apparatus side in this manner, the inspection step is simplified and allows easy correction, and consequently, an overall reduction of the cost can be achieved.

Thereafter, the control sequence of the CPU 91 advances to step 106, which serves as calculating means (numeral 202 in FIG. 8) for integrating the deceleration fetched at step 102 to calculate a calculated displacement amount, or in this case a velocity value $\Delta V$.

Then, the control sequence advances to step 108, which serves as waveform judging means (numeral 204 in FIG. 8) for judging whether or not the waveform width at an initial stage of the deceleration ($-G$) signal from the acceleration sensor 15 has continued for a predetermined interval of time or more.

Figure 7:
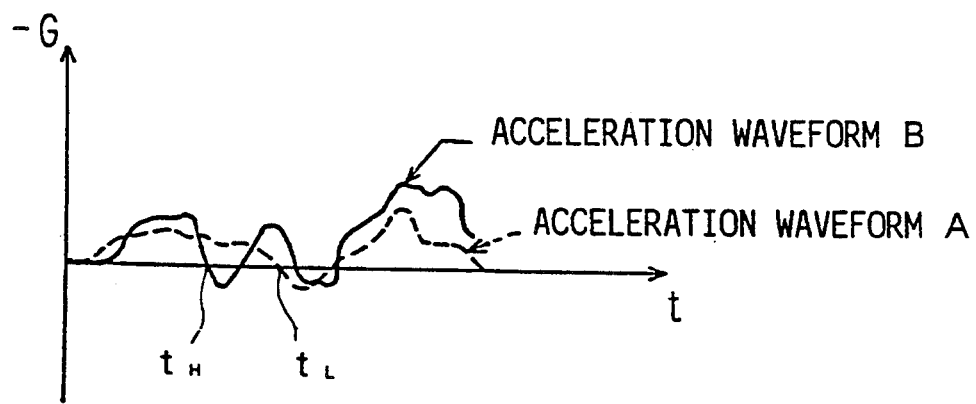
FIG. 7 is a diagram showing deceleration signals from the acceleration sensor when the velocity of the vehicle is low (acceleration waveform A) and high (acceleration waveform B)

Here, basic waveforms of the deceleration ($-6$) signal from the acceleration sensor 15 when the velocity of the vehicle is low and high vary in such a manner as shown in FIG. 7. The predetermined interval of time mentioned above is set to a suitable value within an interval of time from a point of time $t_H$ to another point of time $t_L$ shown in FIG. 7.

When it is judged at step 108 that the deceleration ($-G$) signal has continued for the predetermined interval of time or more, that is, the vehicle is running at a low velocity, the control sequence of the CPU 91 advances to step 110 which serves as threshold value correcting means (numeral 208 in FIG. 8).

In particular, at step 110, the threshold value $\Delta V_1$ (initial value) stored in threshold value storage means 206 (see FIG. 8) set at step 100 is changed over to another threshold value $\Delta V_2$ which cannot be reached by the calculated velocity value $\Delta V$ when the vehicle is running at a low velocity.

On the other hand, when it is judged at step 108 that the deceleration ($-G$) signal has continued but for less than the predetermined interval of time, since the velocity of the vehicle is not low, the threshold value $\Delta V_1$ (initial value) set at step 100 is left as is.

Thereafter, the control sequence of the CPU 91 advances to step 112, which serves as discriminating (numeral 210 in FIG. 8) means for discriminating whether or not the calculated velocity value $\Delta V$ calculated at step 106 reaches the threshold value.

When it is judged at step 112 that the calculated velocity value ΔV has not reached the threshold value as yet, the control sequence advances to step 116, at which it is judged whether or not a predetermined interval of time has elapsed after starting of the program. The predetermined interval of time is determined in consideration of a time within which, when it becomes necessary for the air bag to be rendered operative, the air bag must be rendered operative after a deceleration higher than −3G is detected first.

When it is judged at step 116 that the predetermined interval of time has not elapsed as yet, the control sequence of the CPU 91 returns to step 102 described above so that similar processing is thereafter repeated similarly. On the other hand, when it is judged at step 116 that the predetermined interval of time has elapsed, this means that there is no need to render the air bag operative, and the program comes to an end. Thereafter, the air bag controlling apparatus enters into and remains in a waiting condition until a deceleration higher than −3G, that is, an impact, is detected subsequently.

On the other hand, if it is judged at step 112 that the calculated velocity value ΔV reaches the threshold value $\Delta V_1$, the control sequence of the CPU 91 advances to step 114, which serves as a signal output means (numeral 212 in FIG. 8).

Figure 5:
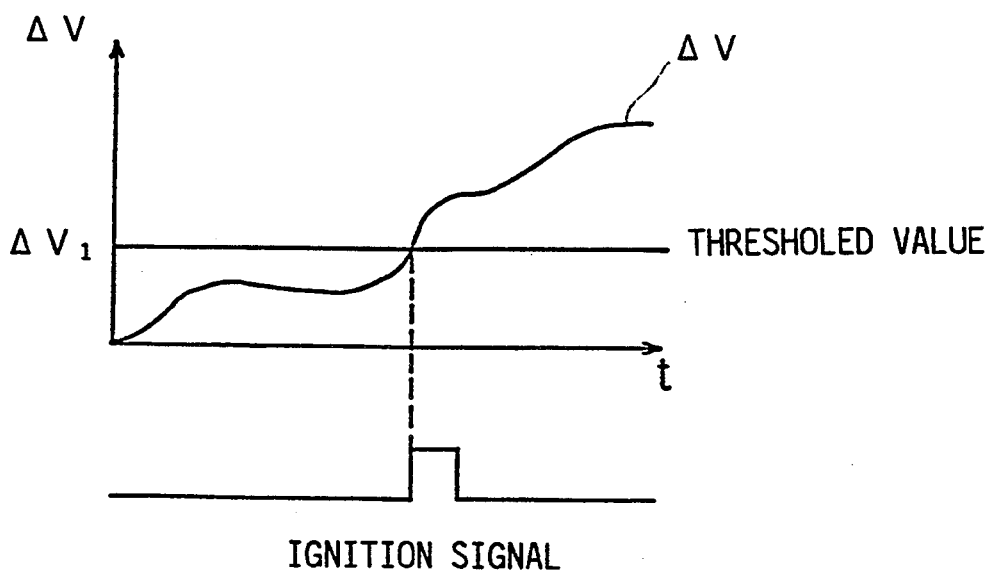
FIG. 5 is a diagram illustrating the relationship of the threshold value $\Delta V_1$ and an ignition signal to the calculated velocity value $\Delta V$ according to the air bag controlling apparatus when the velocity of the vehicle is high.
Figure 6:
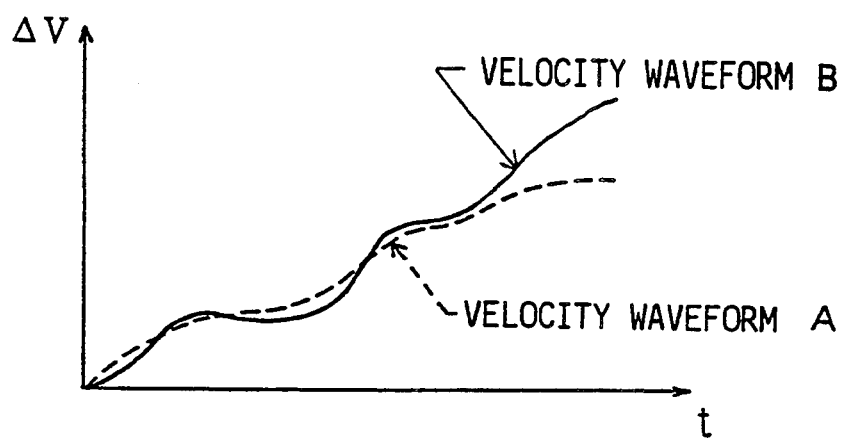
FIG. 6 is a diagram showing calculated velocity values $\Delta V$ obtained by integration of a deceleration signal from an acceleration sensor with respect to time when the velocity of the vehicle is low (velocity waveform A) and high (velocity waveform B)

In particular, at step 114, simultaneously when the calculated velocity value ΔV reaches the threshold value $\Delta V_1$, an ignition signal is output to the inflator 8 as seen from FIG. 5, whereafter the program comes to an end.

In the air bag controlling apparatus of the present invention as applied, since the threshold value for determining operation of the air bag is changed as described above, the air bag is kept inoperative when the velocity of the vehicle is low, but when the velocity of the vehicle is high, the air bag can be rendered operative similarly as with a conventional air bag controlling apparatus.

It is to be noted that the physical displacement of the vehicle calculated at step 106 of the program described above based on the deceleration signal from the acceleration sensor 15 may be, in place of the calculated velocity value ΔV, a calculated displacement value obtained by integration of the deceleration signal twice over time. In this instance, a value corresponding to such calculated displacement value is used as the threshold value in the processing at steps 110 and 112.

Further, the displacement amount described above may otherwise be an energy value obtained by raising the calculated velocity value ΔV to the second power. A value corresponding to the calculated displacement value is used as the threshold value then.

Further, in the embodiment described above, the threshold value is changed depending upon whether or not the waveform width at an initial stage of the deceleration (−G) signal has continued for the predetermined interval of time or more. However, since the operation timing of the air bag is determined from the relationship between the threshold value and a physical displacement amount of the vehicle obtained by calculating processing of a deceleration, alternatively the physical displacement amount of the vehicle may be corrected to a reduced value depending upon whether or not the waveform width at an initial stage of the deceleration (−G) signal has continued for the predetermined interval of time or more while the threshold value is kept fixed.

What is claimed is:

1. An air bag controlling apparatus for controlling inflation of an air bag for a motor vehicle and adapted to cooperate with (a) an acceleration sensor which generates a deceleration signal as a function of the vehicle's deceleration, and (b) an inflator which provides said air bag with compressed gas when ignited by an igniter, said air bag controlling apparatus comprising:

threshold value storage means for storing a threshold value used in determining whether the inflator will be ignited;

calculating means for processing the deceleration signal to derive a displacement value as a function of the deceleration of the vehicle;

waveform judging means for evaluating a waveform of said deceleration signal to determine whether an initial period for which the deceleration has a positive value continues for a predetermined interval of time after said acceleration sensor detects a predetermined deceleration;

threshold value correcting means for correcting the threshold value stored in said threshold value storage means when said waveform judging means determines that the initial period for which the deceleration has a positive value has continued for the predetermined interval of time;

discriminating means for determining whether the displacement value derived by said calculating means is greater than the corrected threshold value; and signal output means for outputting an ignition signal to said inflator so that said inflator is ignited and said air bag is inflated when the discriminating means determines that the displacement value derived by the calculating means is greater than the corrected threshold value.

2. An air bag controlling apparatus according to claim 1, further comprising storage means for storing a correction coefficient used for correcting the deceleration signal generated by said acceleration sensor, and correcting means for correcting the deceleration signal generated by said acceleration sensor with the correction coefficient.

3. An air bag controlling apparatus according to claim 1, wherein the calculating means calculates the displacement value by twice integrating the deceleration obtained from said acceleration sensor over time, said displacement value being equal to a function of a change in position of the vehicle over time.

4. An air bag controlling apparatus according to claim 1, wherein the calculating means calculates the displacement value by integrating the deceleration signal generated by said acceleration sensor over time, said displacement value being equal to a function of a change in velocity of said vehicle over time.

5. An air bag controlling apparatus according to claim 4, wherein the calculating means calculates the displacement value by squaring the change in velocity obtained by integration of the deceleration signal generated by said acceleration sensor over time, said displacement value being equal to a function of a change in kinetic energy of said vehicle over time.

6. An air bag controlling apparatus for controlling inflation of an air bag for a motor vehicle and adapted to cooperate with (a) an acceleration sensor which generates a deceleration signal as a function of the vehicle's deceleration, and (b) an inflator which provides said air bag with compressed gas when ignited by an igniter, said air bag controlling apparatus comprising:

threshold value storage means for storing a threshold value used in determining whether the inflator will be ignited;

calculating means for processing the deceleration signal to derive a displacement value as a function of the deceleration of the vehicle;

waveform judging means for evaluating a waveform of said deceleration signal to determine whether an initial period for which the deceleration has a positive value continues for a predetermined interval of time after said acceleration sensor detects a predetermined deceleration;

displacement value correcting means for correcting the displacement value by reducing the displacement value when said waveform judging means determines that the initial period for which the deceleration has a positive value has continued for the predetermined interval of time;

discriminating means for determining whether the displacement value derived by said calculating means and corrected by said correcting means is greater than the threshold value stored in said threshold value storage means; and signal output means for outputting an ignition signal to said inflator so that said inflator is ignited and said air bag is inflated when the discriminating means determines that the displacement value derived by the calculating means and corrected by said correcting means is greater than the threshold value.

7. An air bag controlling apparatus according to claim 6, further comprising storage means for storing a correction coefficient used for correcting the deceleration signal generated by said acceleration sensor, and correcting means for correcting the deceleration signal generated by said acceleration sensor with the correction coefficient.

8. An air bag controlling apparatus according to claim 6, wherein the calculating means calculates the displacement value by twice integrating the deceleration obtained from said acceleration sensor over time, said displacement value being equal to a function of change in position of said vehicle over time.

9. An air bag controlling apparatus according to claim 6, wherein the calculating means calculates the displacement value by integrating the deceleration signal generated by said acceleration sensor over time, said displacement value being equal to a function of a change in velocity of the vehicle over time.

10. An air bag controlling apparatus according to claim 9, wherein the calculating means calculates the displacement value squaring the change in velocity obtained by integration of the deceleration signal generated by said acceleration sensor over time, said displacement value being equal to a function of a change in kinetic energy of said vehicle over time.

11. An air bag assembly for a motor vehicle comprising:

an inflator for discharging compressed gas when ignited by an ignition signal;

an inflatable air bag which is inflated by the compressed gas discharged by said inflator;

an acceleration sensor capable of detecting a deceleration of said vehicle and generating a deceleration signal as a function of said deceleration, said deceleration signal having a waveform over time;

threshold value storage means for storing a threshold value used in determining whether the inflator will be ignited;

calculating means for processing the deceleration signal to derive a displacement value as a function of the deceleration of the vehicle;

waveform judging means for evaluating the waveform of said deceleration signal to determine whether an initial period for which the deceleration has a positive value continues for a predetermined interval of time after said acceleration sensor detects a predetermined deceleration;

threshold value correcting means for correcting the threshold value stored in said threshold value storage means when said waveform judging means determines that the initial period for which the deceleration has a positive value has continued for the predetermined interval of time;

discriminating means for determining whether the displacement value derived by said calculating means is greater than the corrected threshold value; and signal output means for outputting the ignition signal to said inflator so that said inflator is ignited and said air bag is inflated when the discriminating means determines that the displacement value derived by the calculating means is greater than the corrected threshold value.

12. An air bag assembly according to claim 11, wherein the calculating means derives the displacement value by twice integrating the deceleration obtained from said acceleration sensor over time, said displacement value being equal to a function of a change in position of the vehicle over time.

13. An air bag assembly according to claim 11, further comprising storage means for storing a correction coefficient used for correcting the deceleration signal generated by said acceleration sensor and correcting means for correcting the deceleration signal generated by said acceleration sensor with the correction coefficient.

14. An air bag assembly according to claim 11, wherein the calculating means derives the displacement value by integrating the deceleration signal generated by said acceleration sensor over time, said displacement value being equal to a function of a change in velocity of said vehicle over time.

15. An air bag assembly according to claim 14, wherein the calculating means derives the displacement value by squaring the change in velocity obtained by integration of the deceleration signal generated by said acceleration sensor over time, said displacement value being equal to a function of a change in kinetic energy of said vehicle over time.

16. An air bag assembly for a motor vehicle comprising:

an inflator for discharging compressed gas when ignited by an ignition signal;

an inflatable air bag which is inflated by the compressed gas discharged by said inflator;

an acceleration sensor capable of detecting a deceleration of said vehicle and generating a deceleration signal as a function of said deceleration, said deceleration signal having a waveform over time;

threshold value storage means for storing a threshold value used in determining whether the inflator will be ignited;

calculating means for processing the deceleration signal to derive a displacement value as a function of the deceleration of the vehicle;

waveform judging means for evaluating the waveform of said deceleration signal to determine whether an initial period for which the deceleration has a positive value continues for a predetermined interval of time after said acceleration sensor detects a predetermined deceleration;

displacement value correcting means for correcting the displacement value by reducing the displacement value when said waveform judging means determines that the initial period for which the deceleration has a positive value has continued for the predetermined interval of time;

discriminating means for determining whether the displacement value derived by said calculating means and corrected by said correcting means is greater than the threshold value stored in said threshold value storage means; and signal output means for outputting the ignition signal to said inflator so that said inflator is ignited and said air bag is inflated when the discriminating means determines that the displacement value derived by the calculating means and corrected by said correcting means is greater than the threshold value.

17. An air bag assembly according to claim 16, further comprising storage means for storing a correction coefficient used for correcting the deceleration signal generated by said acceleration sensor, and correcting means for correct the deceleration signal generated by said acceleration sensor with the correction coefficient.

18. An air bag assembly according to claim 16, wherein the calculating means derives the displacement value by twice integrating the deceleration obtained from said acceleration sensor over time, said displacement value being equal to a function of a change in position of said vehicle over time.

19. An air bag assembly according to claim 16, wherein the calculating means derives the displacement value by integrating the deceleration signal generated by said acceleration sensor over time, said displacement value being equal to a function of a change in velocity of the vehicle over time.

20. An air bag assembly according to claim 19, wherein the calculating means derives the displacement value by squaring the change in velocity obtained by integration of the deceleration signal generated by said acceleration sensor over time, said displacement value being equal to a function of a change in kinetic energy of said vehicle over time.

* * * * *